Dec. 14, 1943.   G. D. BRIMBLE   2,336,841
BRAKE ACTUATING UNIT
Filed Nov. 6, 1942
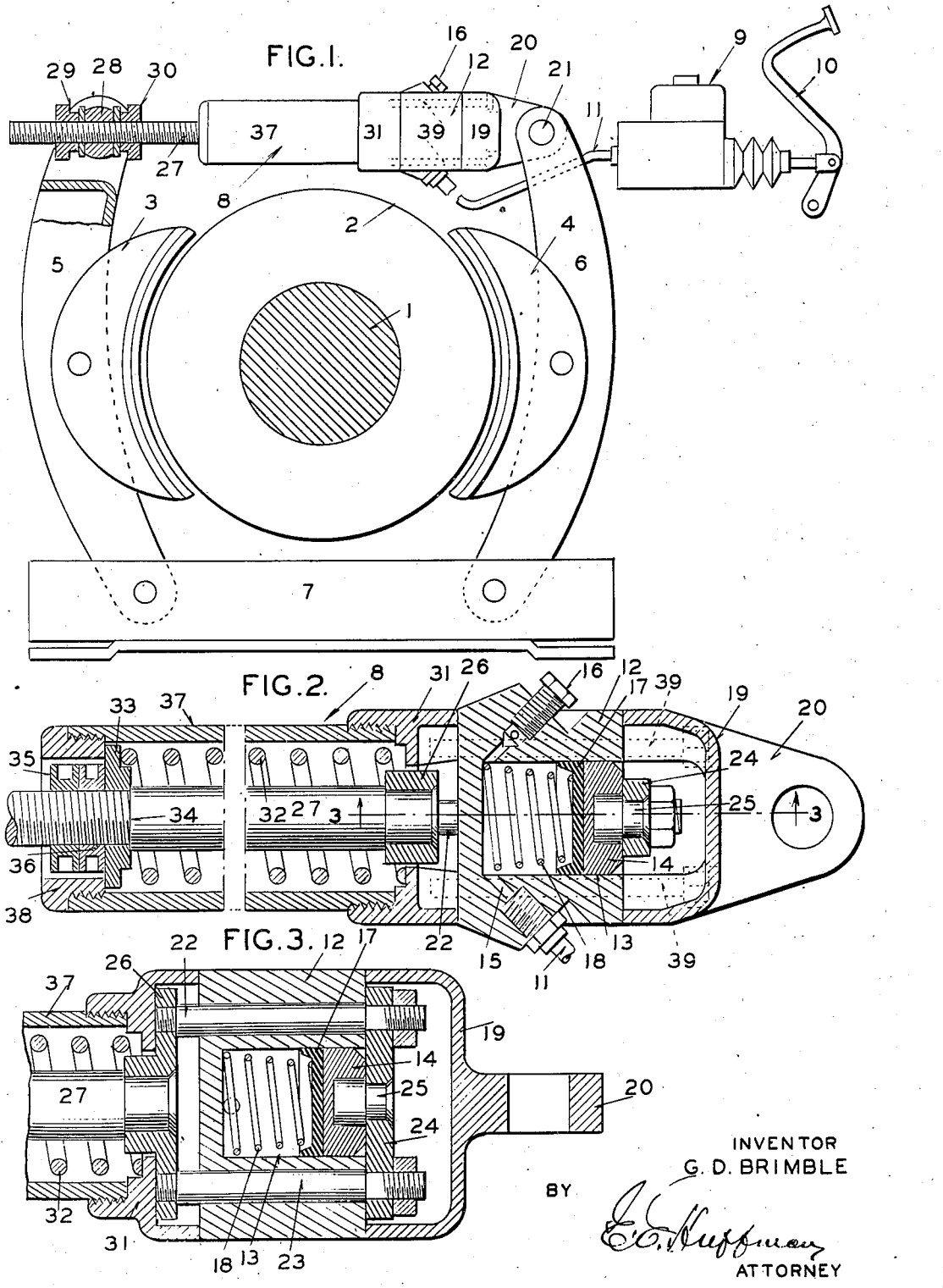
INVENTOR
G. D. BRIMBLE
BY
ATTORNEY Patented Dec. 14, 1943

2,336,841

UNITED STATES PATENT OFFICE 2,336,841

BRAKE ACTUATING UNIT

George D. Brimble, University City, Mo., assignor to Wagner Electric Corporation, St. Louis, Mo., a corporation of Delaware Application November 6, 1942, Serial No. 464,743

7 Claims. (Cl. 188—152)

My invention relates to fluid pressure actuating units and more particularly to one for actuating a brake.

One of the objects of my invention is to produce an improved actuating unit for a brake which embodies a fluid pressure means for applying the brake and a brake releasing spring.

Another object of my invention is to produce an actuating unit of the kind referred to which is so arranged and constructed that a simple and compact structure is obtained with the parts shielded against dirt and harmful weather conditions.

Other objects of my invention will become apparent from the following description taken in connection with the accompanying drawing in which Figure 1 is a view showing a braking assembly embodying my improved actuating unit; Figure 2 is a longitudinal sectional view of the unit; and Figure 3 is a sectional view taken on the line 3—3 of Figure 2.

Referring to the drawing and first to Figure 1 there is disclosed a brake for a shaft 1, said brake comprising a drum 2 mounted on the shaft and having cooperating therewith two brake shoes 3 and 4 pivotally mounted on levers 5 and 6, said levers being pivoted at their lower ends on a supporting base 7. The upper ends of the levers are controlled by my improved actuating unit generally indicated by the numeral 8 and being interposed between the upper ends of said levers and carried thereby. This unit is so constructed that hydraulic pressure developed by a suitable source can move the levers toward each other to apply the brakes. When the hydraulic pressure is released, the brakes will be retracted by spring means incorporated in the unit. As shown, the hydraulic pressure producing means may comprise a master cylinder device 9 manually operated by a pedal 10 and connected to the unit by a conduit 11.

The details of the actuating unit are best shown in Figures 2 and 3. The unit comprises a main body member 12 provided with a cylinder 13 closed at one end and having a piston 14 reciprocable therein. An inlet port 15 connects the cylinder to conduit 11 so that fluid under pressure may be received in the cylinder from the master cylinder device. A bleeder plug 16 is also provided for eliminating air in the system during filling or at any other time. The piston has associated therewith a sealing cup 17 held against the piston head by a light spring 18. The body member 12 is provided with a closure cap 19 for its open end and an extension 20 on the cap provides means for connecting the member to lever 6 by means of a pivot pin 21 (Figure 1).

The body member 12 has two rods 22 and 23 reciprocably mounted therein on opposite sides of cylinder 13. As viewed in Figures 2 and 3, the right hand ends of these rods are connected together and to piston 14 by a cross-plate 24 lying within cap 19, a pin 25 connecting the piston to the central part of the plate. The left hand ends of the rods are also connected together by a plate 26 and secured to the central portion of this plate is one end of a rod 27 extending away from the body member 12 and axially aligned with the common axis of the cylinder and piston. The remote end of rod 27 is provided with threads and extends through an opening in a pin 28 (Figure 1) carried by the upper end of lever 5. Nuts 29 and 30 are positioned on opposite sides of pin 28 to connect the threaded end of the rod to the pin and provide means for adjusting the relationship between the lever and rod.

In addition to the cap 19 on the right hand end of the body member 12, there is a second cap 31 on the left hand end of said member, said latter cap enclosing plate 26. Abutting against cap 31 is one end of a coil spring 32 in surrounding relation to rod 27, the other end of said spring abutting against a washer 33 clamped on the rod against a shoulder 34 at the inner end of the threads on the rod by means of nuts 35 and 36. The spring 32 is enclosed within a cylindrical casing 37 carried as an extension of cap 31. An annular plug 38 is provided to close the major portion of the open end of casing 37. The caps 19 and 31 are secured to the body member 12 by means of through-bolts 39.

The various part of the actuating member are shown in their normally inoperative positions assumed when the brake is released. Under these conditions the nuts 29 and 30 are so adjusted that the brake shoes will have the proper clearance with the drum. The shoes are held in retracted position by the action of the coil spring 32 which biases rod 27 to the left and the body member 12 to the right, thus separating levers 5 and 6 which carry the brake shoes. In the retracted condition of the brake shoes, plate 24 will abut the body member 12.

When it is desired to apply the brakes, fluid pressure is developed by the master cylinder device 9, thereby forcing fluid under pressure into cylinder 13 and causing the body member and piston to have relative movement away from each other, that is, the body member will move to the left and the piston to the right. Since piston 14 is connected to lever 5 and the body member to lever 6, it is apparent that the levers will be pulled toward each other, thereby applying the brake shoes to the drum. When the fluid pressure is released, the spring 32 will become effective to again retract the brake shoes from the drum. When the permissible relative movement between the body member and the piston is insufficient to properly apply the brakes due to wear of the linings of the brake shoes, adjustment may be made by means of the nuts 29 and 30 to thus compensate for this lining wear.

From the foregoing it is seen that I have produced a very simple and compact actuating unit for a brake which can be easily attached to the ends of the brake shoe carrying levers and also readily removed when desired. All the moving parts are enclosed, thus permitting the unit to be used on brakes positioned outdoors as dirt, foreign material and harmful weather elements will be excluded from the moving parts. All the parts of the unit can be readily removed whenever repair is found necessary. It is also to be noted that the releasing spring can be very easily placed under compression during assembly since nuts 35 and 36 are screwed over a long thread on the rod.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. An actuating unit for moving two elements toward each other, said unit comprising a member provided with a cylinder closed at one end, a piston in the cylinder, a rod axially aligned with the common axis of the cylinder and piston and positioned to extend away from the closed end of the cylinder, a connection between the piston and the rod and comprising an element slidably mounted on the member parallel with the axis of the cylinder, means for connecting the member to one of the elements to be moved, means for connecting the remote end of said rod to the other element to be moved, and spring means interposed between the rod and the member to bias them in directions away from each other.

2. An actuating unit for moving two elements toward each other, said unit comprising a member provided with a cylinder closed at one end, a connection between the member and one of the elements and including means enclosing the open end of the cylinder, a piston in the cylinder, rods slidable in the member, a connection between the rods and the piston positioned within the enclosing means for the open end of the cylinder, a rod axially aligned with the common axis of the cylinder and piston, means for connecting one end of said rod to the first named rods, means for connecting the other end of said rod to the other element, a coil spring surrounding the last named rod and interposed between the member and an abutment on the rod, and a casing carried by the member and enclosing the spring.

3. In braking mechanism having a drum and cooperating friction means mounted on two pivoted levers, and means cooperating with the levers for moving them toward each other by fluid pressure to apply the friction means and away from each other by spring action to release the friction means, said means comprising a member connected to one lever and having a cylinder therein, a piston mounted in the cylinder, a connection between the piston and the other lever, said connection being operatively connected to the piston at one end of the cylinder and extending around the cylinder and beyond the other end of the cylinder and comprising a rod axially aligned with the common axis of the cylinder and piston, fluid pressure means connected to the cylinder for moving the piston and cylinder relatively in opposite directions away from each other and a spring interposed between the rod and the cylinder for moving the piston and cylinder relatively in opposite directions toward each other when fluid under pressure is released from the cylinder.

4. In braking mechanism having a drum and cooperating friction means mounted on two pivoted levers, and means cooperating with the levers for moving them toward each other by fluid pressure to apply the friction means and away from each other by spring action to release the friction means, said means comprising a member connected to one lever and having a cylinder therein, a piston mounted in the cylinder, a connection between the piston and the other lever, said connection being operatively connected to the piston at one end of the cylinder and extending around the cylinder and beyond the other end of the cylinder and comprising a rod axially aligned with the common axis of the cylinder and piston, fluid pressure means connected to the cylinder for moving the piston and cylinder relatively in opposite directions away from each other, a spring interposed between the rod and the cylinder and in surrounding relation to the rod for moving the piston and cylinder relatively in opposite directions toward each other when fluid under pressure is released from the cylinder and a casing enclosing the spring and carried by the member having the cylinder.

5. In braking mechanism having a drum and cooperating friction means mounted on two pivoted levers, means cooperating with the levers for moving them toward each other by fluid pressure to apply the friction means and away from each other by spring action to release the friction means, said means comprising a member connected to one lever and having a cylinder therein, a piston mounted in the cylinder, a connection between the piston and the other lever, said connection being operatively connected to the piston at one end of the cylinder and extending around the cylinder and beyond the other end of the cylinder and piston and having its end remote from the cylinder adjustably connected to said other lever, fluid pressure means connected to the cylinder for moving the piston and cylinder relatively in opposite directions away from each other, and a spring interposed between the rod and the cylinder and in surrounding relation to the rod for moving the piston and cylinder relatively in opposite directions toward each other when fluid under pressure is released from the cylinder.

6. An actuating unit for moving two elements toward each other, said unit comprising a cylinder having a closed end, a piston in the cylinder, fluid pressure means connected to the cylinder for causing the cylinder and piston to have such relative movement that the piston is positioned farther from the closed end of the cylinder, means for connecting the end of the cylinder opposite the closed end to one of the elements, a rod axially aligned with the common axis of the piston and cylinder and extending away from the closed end of the cylinder, means exterior to the cylinder for connecting the rod and piston, and a coil spring surrounding the rod and interposed between an abutment on the rod and the cylinder for biasing the piston and cylinder and the two elements toward their inoperative positions.

7. An actuating unit for moving two elements toward each other, said unit comprising a member provided with a cylinder closed at one end, a piston in the cylinder, a rod axially aligned with the common axis of the cylinder and piston and positioned to extend away from the closed end of the cylinder, said rod having threads extending inwardly from its remote end over a substantial portion of its length, a connection between the piston and the rod, means for connecting the member to one of the elements to be moved, means cooperating with the threads for connecting the remote end of the rod to the other element to be moved, a spring surrounding the rod, and abutment means on the rod and the member maintaining the spring compressed, said abutment means on the rod including means cooperating with the threads and employed to compress the spring when installed.

GEORGE D. BRIMBLE.